United States Patent [19]

Glinecke

[11] 4,346,554
[45] Aug. 31, 1982

[54] FUSIBLE LINK CONSTRUCTION

[75] Inventor: Hermann R. Glinecke, Pennington, N.J.

[73] Assignee: Globe Fire Equipment Company, Standish, Mich.

[21] Appl. No.: 93,398

[22] Filed: Nov. 13, 1979

[51] Int. Cl.³ .............................................. F16G 15/04
[52] U.S. Cl. ........................................ 59/93; 16/48.5; 169/38
[58] Field of Search ........... 24/201 LP, 116 R, 115 F, 24/31 L; 49/8, 7, 4, 1; 16/48.5; 59/93, 85, 86, 78; 169/38

[56]           References Cited
        U.S. PATENT DOCUMENTS
    3,336,984  8/1967  Macartney ............................. 169/38

Primary Examiner—Mark Rosenbaum
Attorney, Agent, or Firm—Learman & McCulloch

[57] ABSTRACT

A fusible link having two body members separably coupled to one another and normally prevented from separating by a collapsible strut. One body member has an opening in which the other body member is slideably accommodated, such other body member having an abutment which bears against the body at one marginal edge of the opening. The strut is accommodated within the opening and reacts between the two body members to preclude movement of the slideable body to a position in which the abutment can pass through the opening in the other body. The strut includes a eutectic alloy which melts when its temperature rises to a predetermined level. Melting of the eutectic alloy permits the overall length of the strut to shorten by an amount sufficient to permit the abutment on the slideable body to pass through the opening in the other body and effect separation of the bodies.

13 Claims, 5 Drawing Figures

FUSIBLE LINK CONSTRUCTION

BACKGROUND OF THE INVENTION

The invention relates to a fusible link construction of the kind especially adapted for use in conditioning, for automatic operation in the event of a fire, the release of a locking mechanism, the closing of a fire door, the release of a sprinkler operating lever, and the like. Conventionally, such mechanisms have a weight or spring biased actuator maintained in a non-operating position against the bias of the weight or spring by means of a so-called fusible link, which, in response to the increase to a predetermined level of the ambient temperature, separates and enables the bias imposed on the operator to move the latter from its non-operating position to its operating position.

Various kinds of fusible links have been proposed heretofore, one of the most common of which comprises a pair of flat bodies arranged side by side and separably bonded to one another by a thermally sensitive substance which liquifies when its temperature is raised to a predetermined level, thereby destroying the bond between the links and permitting them to separate.

Another fusible link of the general class to which the invention relates is that disclosed in U.S. Pat. No. 3,779,004 granted Dec. 18, 1973. This construction employs a first link having an opening therein and a second link having a loop portion that is accommodated in the opening of the first link. Fitted into the loop is a strut which normally is of such length as to span the opening and prevent withdrawal of the loop from the opening.

One of the disadvantages of the side-by-side links bonded to one another is that the thermally sensitive bonding material has a tendency to creep over a period of time, particularly if it is subject to tensile or compressive forces. In time, therefore, the bonding material may creep to an extent such that it is incapable of maintaining the plates in joined condition or permits shortening or elongation of the assembly to the point that proper operation of the mechanism whose operation is to be controlled cannot be ensured. A disadvantage of the second known fusible link construction referred to above, aside from the multiplicity of parts of which it is constructed, is the difficulty of assembling such parts, as well as combatting the tendency of the thermally sensitive material to creep or cold flow.

One of the objects of the present invention, therefore, is to provide a fusible link construction which overcomes the disadvantages of known constructions adapted for similar purposes.

SUMMARY OF THE INVENTION

A fusible link assembly constructed in accordance with the invention comprises first and second body members, the first of which has an opening through which the second body slideably extends and bears against one marginal edge of the opening. The slideable body has a projection capable of abutting the first body adjacent the opening to limit relative movement between the two bodies. Accommodated in the opening and seated on the slideable member is a collapsible strut which spans the distance between the slideable body and the opposite marginal edge of the opening so as to prevent movement of the slideable body in such manner as to enable the projection to pass through the opening.

The collapsible strut is composed, in part, of a eutectic member which liquifies in response to its temperature reaching a predetermined level. Liquification of the eutectic member and resultant displacement thereof enables the strut to collapse or shorten, thereby making possible the shifting of the relative positions of the body members and withdrawal of the slideable member through the opening in the other member with resulting separation of the two members.

DESCRIPTION OF THE DRAWINGS

A preferred embodiment of the invention is disclosed in the accompanying drawings wherein.

DETAILED DESCRIPTION OF THE INVENTION

Figure 1:
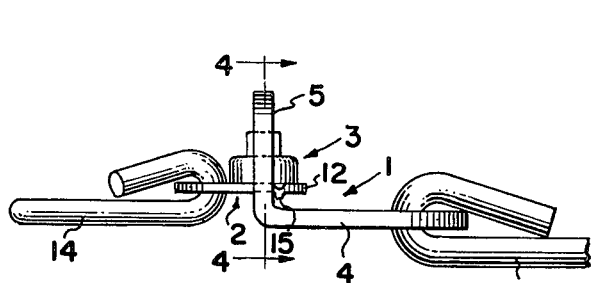
FIG. 1 is a side elevational view of the assembled fusible link construction.

A fusible link constructed in accordance with the invention comprises, essentially, three component parts, namely, a first body 1, a second body 2, and a collapsible strut 3.

The body 1 preferably comprises a pair of right angular planar legs 4 and 5, the leg 4 having an opening 6 therein for the reception of a chain link 7. The leg 5 has an opening 8 therein provided with two opposed, spaced apart, marginal edges 9 and 10. The marginal edge 9 is flat or planar, whereas the marginal edge 10 has a centrally located, curvilinear projection 11 which forms a retainer and fulcrum or axis of rotation for a purpose presently to be explained.

The body member 2 comprises a substantially flat, blade-like member 12 having an opening 13 therein for the reception of a chain link 14. The blade 12 is deformed between its ends to form an abutment or projection 15 which extends to one side of the plane of the blade, the rib having tapering or inclined sides 16. The deformation of the blade 12 forms a groove 17 in its opposite surface. Preferably, the rib 15 and the groove 17 extend the entire width of the blade 12.

The collapsible strut 3 comprises a hollow housing having an annular sidewall 18 and a flat base 19 formed of a material having excellent thermal conductivity. The base 19 has a centrally located opening 20 therein. Accommodated in the housing is a wafer 21 composed of a eutectic alloy of known kind. The wafer is solid at all temperatures below a predetermined temperature, and liquifies at such predetermined temperature.

Also accommodated in the housing is one end 22 of a post 23, the opposite end 24 of which extends beyond the housing. The end 22 of the post is provided with the peripheral flange 25 of such diameter as to be accommodated freely within the housing wall 18 in face-to-face engagement with the wafer 21. The free end of the wall 18 is deformed inwardly so as to form a marginal edge 26 which overlies the flange 25 and maintains the latter firmly against the wafer 21. Preferably, the wafer 21 fills the entire volume of a chamber 27 formed by the wall 18, the base 19, and the post 23, as well as substantially filling the opening 20 in the base 19. The exposed end 24 of the post 23 is provided with a concave retainer recess 28 for a purpose to be explained.

To assemble the three component parts of the apparatus, the collapsible strut 3 is positioned in the opening 8 of the leg 5 so that the projection 11 is accommodated in and nests with the recess 28. The body 2, without the link 14 being attached, is slid into the opening 8 from right to left, as viewed in FIGS. 1 and 3, and between the base of the strut 3 and the marginal edge 9 of the opening so as to cause the blade to bear against the marginal edge 9 of the opening 8. The rib 15 then will abut the leg 5 adjacent the marginal edge 9 of the opening 8 so as to prevent further movement of the blade to the left. The link 14 then may be fitted into the opening 13 in the body 2 and the link 7 may be fitted into the opening 6 in the body 1.

Upon completion of the foregoing assembling steps, and for reasons which will be pointed out subsequently, the strut 3 will be trapped between the member 2 and the marginal edge 10 of the opening 8 and the member 2 cannot be withdrawn in either direction from the opening 8.

Figure 4:
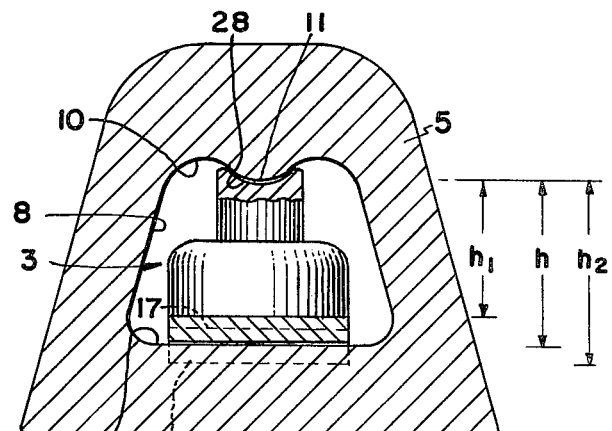
FIG. 4 is a greatly enlarged, sectional view taken on the line 4—4 of FIG. 1.
Figure 5:
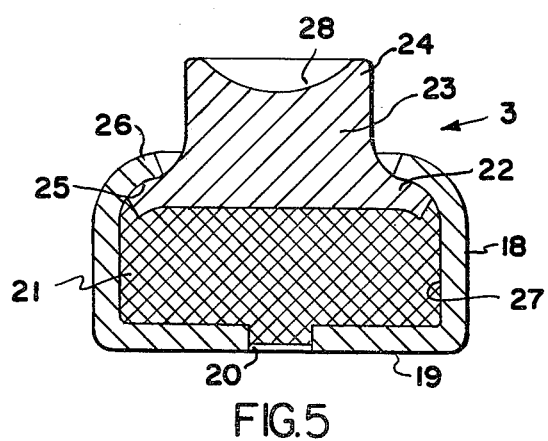
FIG. 5 is a vertical sectional view, on a greatly enlarged scale, of a collapsible strut.

The distance between the marginal edge 9 of the opening 8 and the tip of the projection 11 is represented in FIG. 4 by the letter h. The distance between the upper surface of the blade 12 and the tip of the projection 11 is represented by the letter $h_1$. The distance between the tip of the projection 11 and the free edge of the rib 15 is represented by the letter $h_2$. For the rib 15 to clear the marginal edge 9 of the opening 8 and permit withdrawal of the member 2 from the opening 8, therefore, the member 2 must be raised relative to the marginal edge 9 a distance at least as great as the difference between the dimensions h and $h_2$. This can occur, however, only if the length of the strut 3 is shortened so as to be less than the dimension $h_1$.

Due to the nesting of the fulcrum 11 and the recess 28 it is not possible to push the strut 3 out of the opening 8 in any direction. The construction of the parts 11 and 28 enables rocking of the strut about the fulcrum, but since the marginal edge of the base of the strut lies radially outwardly of the fulcrum, rocking of the strut imposes a binding force between the fulcrum and the member 2 and transmitted by the strut 3. Movement of the member 2 to the right, as viewed in FIG. 1, will cause the link 14 to engage the strut and apply a force on the latter tending to rock it counterclockwise. Such rocking movement, however, will be resisted by the aforementioned binding force. Thus, once the parts are assembled in the manner shown in FIG. 1 the only way in which the members 1 and 2 may be separated is by shortening the strut 3.

Figure 2:
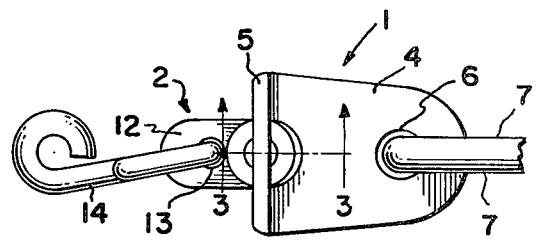
FIG. 2 is a top plan view of the structure shown in FIG. 1.
Figure 3:
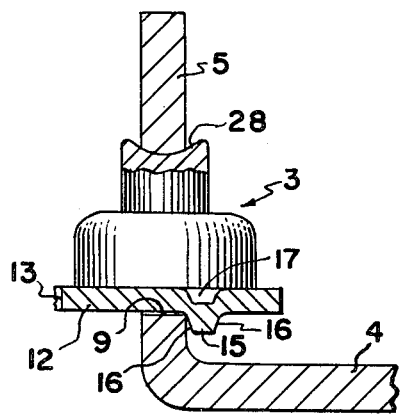
FIG. 3 is a greatly enlarged, sectional view taken on the line 3—3 of FIG. 2.

When the apparatus is assembled in the manner shown in FIGS. 1 and 2, the application of a tensile force to the members 1 and 2 will cause the rib 15 to bear forcibly against the body leg 5 adjacent the marginal edge 9 of the opening 8. Since the confronting side 16 of the rib 15 is inclined, the tensile force applied to the member 2 will cause the latter to move toward the base of the strut 3 and subject the latter to a compressive force between the fulcrum 11 and the blade 12. Such force will be resisted by the strut. These positions of the parts are shown in FIGS. 3 and 4 and it will be observed that the free edge of the rib 15 is well below the level of the marginal edge 9 of the opening 8, thereby maintaining the rib 15 in abutting relation with the leg 5 of the member 1.

The eutectic material from which the wafer 21 is made may have any one of a number of a critical temperatures, i.e., a temperature at which the eutectic material changes from a solid to a liquid. For example, the eutectic alloy may have a critical temperature of 135°, 165°, 212° F. or any other selected higher or lower temperature.

When the eutectic wafer is subjected to its critical or melting temperature, it liquifies and drains through the opening 20 in the base 19 of the strut 3. As the liquified eutectic alloy drains, tensile force applied on the members 1 and 2 will cause the latter to move upwardly, as is permitted by the inclined surface 16, so as to shorten the length of the strut. As the strut shortens in length, the blade 12 will move progressively toward the left, as viewed in FIG. 3, so as to move the groove 17 more fully into register with the drain opening 20 and allow a greater rate of flow of liquified alloy from the chamber 27. Eventually, the length of the strut 3 thus will be shortened by an amount sufficient to enable the blade 12 to move to a position in which the abutment 15 may clear the marginal edge 9 of the opening, whereupon the blade 12 will be withdrawn from the opening effecting separation of the members 1 and 2.

The disclosed embodiment is representative of a presently preferred form of the invention, but is intended to be illustrative rather than definitive thereof. The invention is defined in the claims.

I claim:

1. A fusible link construction comprising a first body having an opening therein with two spaced apart, opposed marginal edges, said first body having an extension projecting in one direction therefrom; a second body extending slidably through said opening at one marginal edge thereof, said second body having an extension projecting in one direction therefrom, said extensions projecting from their respective bodies in opposite directions; a collapsible strut accommodated in said opening and spanning the distance between said second body and the opposite marginal edge of said opening; normally engaged retaining means carried by said first body and said strut; abutment means carried by said second body and extending beyond said one marginal edge of said opening for engagement with said first body; thermally sensitive means forming part of said strut and normally preventing movement of said second body toward said opposite marginal edge of said opening a distance sufficient to enable said abutment to clear said one marginal edge of said opening, said thermally sensitive means being responsive to an increase in its temperature to a predetermined level to enable collapse of said strut an amount sufficient to enable said abutment to clear said opposite marginal edge of said opening and said second body to be withdrawn from said opening; and means on each of said extensions for coupling them to force applying means operable to withdraw said second body from said opening in response to collapse of said strut.

2. A construction according to claim 1 wherein said retaining means comprises a recess in said strut and a projection extending from said first body and accommodated in said recess.

3. A construction according to claim 1 wherein said abutment means comprises a projection on said second body.

4. A construction according to claim 1 wherein said second body has a substantially planar portion extending through said opening, said planar portion being deformed to form a groove at one side thereof and a projection at the opposite side thereof, said projection constituting said abutment means.

5. A construction according to claim 1 wherein said retaining means comprises nested parts enabling rocking movement of said strut about an axis adjacent said opposite marginal edge of said opening.

6. A construction according to claim 5 wherein the distance from said axis to said one marginal edge of said opening corresponds substantially to the combined thickness of said second body and the length of said strut when the latter is in its uncollapsed condition.

7. A construction according to claim 6 wherein the collapse of said strut enables the length of the latter to be shortened an amount greater than the distance said abutment means extends beyond said one marginal edge of said opening.

8. The construction set forth in claim 1 wherein said strut comprises a hollow housing having a base, a post having one end accommodated in said housing and its other end projecting beyond said housing, and wherein said thermally sensitive means is interposed between said base and said one end of said post.

9. The construction set forth in claim 8 wherein said thermally sensitive means is composed of a eutectic material which is solid below said predetermined temperature and which liquifies at said predetermined temperature.

10. The construction set forth in claim 9 wherein said housing has an opening therein through which said eutectic material may flow in response to its liquification.

11. The construction set forth in claim 10 wherein the opening in said housing is in its base.

12. The construction set forth in claim 11 wherein said second body has a groove into which liquified eutectic material may flow.

13. A fusible link construction comprising a first body having an opening therein with two opposed marginal edges; a second body slideably accommodated in said opening at one marginal edge thereof; abutment means carried by said second body and projecting beyond said one marginal edge of said opening for engagement with said first body; a collapsible strut accommodated in said opening and seated one end on said second body; means at the opposite end of said strut mounting the latter for swinging movements about a fulcrum, the length of said strut normally corresponding substantially to the distance between said fulcrum and said second body whereby said second body limits swinging movement of said strut; thermally sensitive means forming part of said strut and normally preventing collapse thereof, said thermally sensitive means being responsive to a predetermined increase in temperature to enable collapse of said strut and shortening thereof to a length less than the distance between said fulcrum and said second body; and means carried by each of said bodies and projecting in opposite directions from and beyond said first body for applying forces on said first and second bodies sufficient to effect withdrawal of said second body from said opening in response to collapse of said strut.

* * * * *